United States Patent
Ghanwani et al.

(10) Patent No.: US 6,633,585 B1
(45) Date of Patent: Oct. 14, 2003

(54) ENHANCED FLOW CONTROL IN ATM EDGE SWITCHES

(75) Inventors: Anoop Ghanwani, North Billerica, MA (US); Metin Aydemir, Durham, NC (US); Clark Debs Jeffries, Durham, NC (US); Gerald Arnold Marin, Chapel Hill, NC (US); Norman Clark Strole, Raleigh, NC (US); Ken Van Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,349

(22) Filed: Aug. 13, 1999

(51) Int. Cl.$^7$ .................................................. H04J 3/22
(52) U.S. Cl. ............ 370/468; 370/395.21; 370/395.41; 370/230; 370/235; 709/229; 709/232; 710/29; 710/60
(58) Field of Search ................................ 370/229, 230, 370/230.1, 231, 232, 233, 235, 236.1, 236.2, 237, 468, 465, 400, 401, 402, 234, 249, 235.1, 252, 253, 395.1, 396, 398, 395.2, 395.21, 395.4, 395.41, 477, 449, 458

(56) References Cited

U.S. PATENT DOCUMENTS

| | | | | |
|---|---|---|---|---|
| 5,367,523 A | * | 11/1994 | Chang et al. | 370/235 |
| 5,519,689 A | | 5/1996 | Kim | 370/17 |
| 5,668,951 A | * | 9/1997 | Jain et al. | 709/235 |
| 5,703,870 A | | 12/1997 | Murase | 370/232 |
| 5,745,477 A | * | 4/1998 | Zheng et al. | 370/230 |
| 5,748,629 A | | 5/1998 | Caldara et al. | 370/389 |
| 5,754,530 A | | 5/1998 | Awdeh et al. | 370/232 |
| 5,764,625 A | * | 6/1998 | Bournas | 370/231 |
| 5,768,257 A | | 6/1998 | Khacherian et al. | 370/229 |
| 5,787,072 A | | 7/1998 | Shimojo et al. | 370/231 |
| 5,802,054 A | | 9/1998 | Bellenger | 370/401 |
| 6,049,837 A | * | 4/2000 | Youngman | 709/250 |
| 6,108,306 A | * | 8/2000 | Kalkunte et al. | 370/235 |
| 6,118,761 A | * | 9/2000 | Kalkunte et al. | 370/229 |
| 6,170,022 B1 | * | 1/2001 | Linville et al. | 710/29 |
| 6,519,693 B1 | * | 2/2003 | Debey | 712/201 |

* cited by examiner

*Primary Examiner*—Dang Ton
*Assistant Examiner*—Tri H. Phan
(74) *Attorney, Agent, or Firm*—Bracewell & Patterson LLP; Joscelyn G. Cockburn

(57) ABSTRACT

A method and system within a telecommunications network for allocating available bandwidth among a plurality of sessions that share a common data link. First, a repeating unit time interval is designated for conducting the plurality of sessions. Next, the input flow rate from the source node of each of the sessions into the common data link is monitored. Thereafter, a target flow rate is computed and assigned to each of the sessions. The sum of the target flow rates is equal to the available bandwidth of the common data link. Finally, for each of the sessions in which the monitored input flow rate exceeds the assigned target flow rate, the source node is dynamically paused during each repeating unit time interval, such that the monitored input flow rate conforms to the assigned target flow rate for each of the sessions.

37 Claims, 9 Drawing Sheets

300

ENHANCED FLOW CONTROL IN ATM EDGE SWITCHES

BACKGROUND OF THE INVENTION

1. Technical Field

The present invention relates in general to an improved method and system for managing communications networks. In particular, the present invention relates to a method and system within a telecommunications network for efficiently adapting a pause interval flow control mechanism to a rate-based flow control mechanism. More particularly, the present invention relates to a method and system for allocating bandwidth among a plurality of sessions that utilize both pause interval and rate-based flow control.

2. Description of the Related Art

Traditional Ethernet utilizes the carrier sense multiple access with collision detection (CSMA/CD) network protocol to insure that there is no more than a single station transmitting on a segment at any instant. This contention resolution algorithm has inherent flow control capability. Therefore, in a traditional Ethernet network, congestion can typically happen only at bridges. Conventionally, slow network speeds and flow control provided by higher layer protocols such as Transmission Control Protocol/Internet Protocol (TCP/IP) have meant that flow control at switches was not an issue. However, the recent increase in network speeds up to gigabits per second, coupled with full-duplex transmission capabilities, has mandated the need for a flow control mechanism. The goals of such flow control include efficiency and fairness. To this end, The IEEE 802.3 working group has standardized a mechanism for asymmetric flow control for full duplex Ethernet LANs. The draft standard IEEE 802.3x defines a hop flow control method wherein a switch experiencing congestion delivers a frame to its upstream switch forcing the upstream switch to pause all transmission from a designated port for a time period specified in the frame. The draft standard IEEE 802.3x, requires mandatory interpretation of the mechanisms defined therein for Gigabit Ethernet (1000 Mbs) and 100 Mbs Ethernet while being optional for slower networks with 10 Mbs links.

The standard IEEE 802.3x specifies a pause operation as follows. The purpose of a pause operation is to inhibit transmission of data frames from another station for a period of time. A Media Access Control (MAC) station which wants to inhibit transmission from another station generates a 64-byte pause control frame containing several information fields. One such field is a 6-byte (48-bit) MAC address of the station requesting the pause. Another is a globally assigned 48-bit multicast address assigned by the IEEE for the flow control function. Other fields include a type/length field indicating that the frame is a control frame, a PAUSE opcode field, a pause interval (length of time of the requested pause) field, and a PAD field.

The timespan of a pause interval is measured and assigned in units of time slots. Currently, a time slot is defined as the amount of time required to transmit a 64 byte packet on the given medium. For example, the time slot for 10 Mbs Ethernet is 51.2 microseconds.

A bridge which conforms to IEEE 802.1D standard (ISO/IEC Final CD 15802-3 Information technology—Telecommunications and information exchange between systems—Local and metropolitan area networks—Common specifications—part 3: Media Access Control (MAC) bridges, IEEE P802.1D/D15) will recognize frames with the well-known multicast address and it will not forward such frames.

When a station receives a MAC control frame having a destination address equal to the reserved multicast address, or with the destination address equal to the station's own unique MAC address, and with the PAUSE opcode, the compliant station is required to start a timer for the value indicated by the pause time field in the frame. The new pause time will overwrite any pause value that may be in progress, whether shorter or longer. Note that although the receiving station is required to process and not forward any such frame that includes either the reserved multicast address or its own address, generating a pause frame with any destination address other than the reserved multicast address violates the current standard. Having a station react to both addresses was done to allow future expansion of the flow control protocol to support half duplex links or end-to-end flow control.

The notion of fairness in allocation of network resources is very difficult to quantify and may be defined in a number of ways. One of the simplest definitions of fair allocation is that which provides equal distribution of network resources among all sessions. Every network link has a capacity. Every session has a source node, a destination node, a single path connecting the source node to the destination node, and an offered send rate. Simply put, the goal of max-min fairness is to arrive at send rates for all sessions so that no send rate can be increased without causing some other send rate to decrease due to resulting congestion in some link.

Consider, for instance, the scenario depicted in FIG. 1. As illustrated in FIG. 1, the bottleneck link for sessions 110, 112, and 114 is link 116. Since link 116 has a capacity of 1, each of sessions 110, 112, and 114 is expected to be provided a rate of ⅓. The second link 118 also has a capacity of 1 and is shared by sessions 114 and 122. Since session 114 has already been limited to a flow rate of ⅓, session 122 may be allocated a rate of ⅔. Finally, the capacity of the third link 120 is 2 units of bandwidth. Therefore link 120 will have 1 unit of unutilized bandwidth due to the upstream bottlenecks of sessions 114 and 122.

The example in FIG. 1 illustrates the concept of max-min fairness in which the goal is to maximize the minimum capacity allocated to any session. For a formal treatment of max-min fairness and for an algebraic algorithm for computing the max-min fair share, reference is may be made to D. Bertsekas and R. Gallager, *Data Networks*, Prentice-Hall, Englewood Cliffs, N.J., 1992, incorporated herein by reference. The algebraic algorithm explained therein requires global, simultaneous knowledge of all session demands and all link capacities.

A problematic consequence of max-min fairness appears in FIG. 2. The configuration illustrated in FIG. 2 is adapted from M. Molle and G. Watson, 100BaseT/IEEE 802.12/ Packet Switching, IEEE Communications Magazine, August 1996. Here a switch, SW2 204, experiences congestion on its output port into a link 210 of capacity 2. The response of SW2 204 is to require traffic in both input links, 206 and 212, which feed link 210 to reduce flows to 1. Thus both Session0 218 and Session1 220 are required to reduce rates to 1, as well as Session2 222. It should be noted, however, that optimal max-min allocation would allow rates of 1 for Session0 218 and Session2 222, but 9 for Session1 220.

Asynchronous Transfer Mode (ATM) is a rapidly developing network technology capable of providing real-time transmission of data, video, voice traffic. ATM is connection-oriented and utilizes cell-switching technology that offers high speed and low latency for the support of data, voice, and video traffic. ATM provides for the automatic and guaranteed assignment of bandwidth to meet the specific needs of applications, making it ideally suited for supporting multimedia as well as for interconnecting local area networks (LANs).

ATM serves a broad range of applications very efficiently by allowing an appropriate Quality of Service (QoS) to be specified for differing applications. Various service categories have been developed to help characterize network traffic including: Constant Bit Rate (CBR), Variable Bit Rate (VBR), Unspecified Bit Rate (UBR), and Available Bit Rate (ABR).

Standardized mechanisms for rate-based flow control have been developed for the ABR class of service. ABR is a best effort service class for non-real-time applications such as file transfer and e-mail. An amount of bandwidth termed minimum cell rate (MCR) is reserved for each session. Each session then gets an additional amount of traffic depending upon availability. The total amount of bandwidth that a session is allowed to utilize at any instant is given by the allowable cell rate (ACR). A session is guaranteed a very low loss provided its traffic conforms to its ACR. There are, however, no delay guarantees. An elaborate flow control mechanism is utilized to maximize network utilization, minimize loss, and ensure that sessions share the bandwidth fairly. The flow control mechanism ABR data transmission makes use of available bandwidth and protects against data loss through a congestion notification feedback method. In order to perform flow control, the source of an ABR session periodically sends out control cells called resource management (RM) cells. Switches along the path may indicate congestion by modifying fields in the RM cell. The destination is responsible for turning around the RM cells and sending them back to the source, which then adjusts its ACR based upon that feedback.

Some of the fields in the RM cell which are relevant to implementation of ABR flow control are as follows.

CCR: the current cell rate of the session. This field is filled in by the source with the ACR and is not modified by any of the network elements along the path or the destination.

CI: a single bit utilized as a congestion indicator. In relative rate (RR) marking switches, a congested switch will set this bit in the RM cell. In the case of explicit forward congestion indication (EFCI) switches, the switch sets the EFCI bit in the header of data cells. The destination is then responsible for saving the congestion status and appropriately setting the CI bit in the RM cell before sending it back to the source. A source which receives an RM cell with the CI bit set will reduce its ACR by a predetermined fraction of what it currently holds. This field is important for EFCI and RR marking switches only.

NI: a single bit utilized as a "no-increase" indicator. In RR marking switches, a switch operating at its desired utilization will set this bit in the RM cell. A source which receives an RM cell with its NI bit set will simply maintain its current value of ACR, provided that the CI bit is zero.

ER: this field is utilized only by explicit rate switches. The switch fills this field with the computed estimate of the ACR for the session.

The CI and NI fields are interesting to the source if any of the switches along its path are either RR or EFCI marking switches. If neither of these bits is set, the source increases its send rate by a predetermined fixed quantity. Base on the feedback received from the returning RM cells, the source maintains the ACR value or less for the session. If the session is to be considered conforming, its sending rate must never exceed its ACR. The ACR is computed by the source in the case of EFCI and RR marking switches. For explicit rate (ER) switches, the ACR is simply set to the value contained in the ER field of the returning RM cells.

Switches which support ABR fall into one of three categories based upon their ability to recognize and process RM cells and the per-session state information therein.

Explicit forward congestion indication (EFCI) is the most basic form of ABR flow control. In this scheme, the switches need not be modified at all. Only the source and destination need modification. The switch does not even recognize RM cells. If the switch is congested, it sets a combination of bits in the header of the data cells to indicate congestion. The destination must save this congestion information. When the next RM cell arrives at the destination, the destination will set the CI bit in the RM cell.

Relative rate (RR) marking switches must be able to recognize RM cells. The switch then has the option of setting the NI bit, the CI bit, or neither. If the switch can handle more traffic, it sets neither and increases its rate. If the switch is operating at capacity, perhaps indicated by queue lengths, it will set the NI bit only. When a source receives an RM cell with NI bit set but CI bit not set, it will maintain its current ACR value. If the switch is congested, it will set the CI bit. A source receiving an RM cell with CI bit set will reduce its ACR.

Explicit rate (ER) algorithms assign the computation effort of send rates to the switches. Each switch along a path of a session computes an estimate of the ACR for the session. The minimum of the explicit rate indicated by all switches along the path is returned t the source in the RM cell. The source simply sets its allowable rate to-the value indicated in the RM cell. ER switches are significantly more complex to implement because of the computations that must be performed and the per-session state information that must be maintained by the switch. Further, for the scheme to-be effective, the switch must be able to make accurate utilization measurements in order to estimate the capacity available for ABR traffic. All of the requirements make it difficult to build a competitively priced ER switch for operation in high speed networks.

Due to its inherent speed and switching efficiency characteristics, ATM is increasingly being utilized as a backbone network for connecting packet-switching LANs. As utilized herein, "heterogeneous networks" refer to telecommunications networks that combine packet-switching subnetworks with a cell-switching network (Ethernet connected to an ATM backbone, for example). Similarly, a "hybrid session" refers to a telecommunications session conducted over both a packet-switched and a cell-switched network. It is clearly desirable for the subnetworks within a heterogeneous network to be operably compatible. Variable data packet size is a characteristic of packet-switched systems such as Ethernet. Cell-switched networks, such as ATM, utilize a fixed size data packet known as a "cell". An ATM cell is typically 53 bytes, five of which are utilized for virtual routing information and the other 48 of which are utilized for data.

The ATM Forum LAN Emulation (LANE) working group has developed a specification for seamless interworking between IEEE 802 style LAN technologies and ATM. For small networks, protocol conversion overhead between LANs and an ATM backbone at a router is acceptable. However, for larger systems with Ethernet legacy LANs, a more efficient solution is LAN emulation (LANE). A LANE system consists of some combination of end systems on legacy LANs and end systems attached directly to an ATM switch. LANE allows network managers to integrate ATM into their existing LAN infrastructure in a way that is transparent to end systems, thereby allowing for faster deployment of ATM in campus backbone networks.

Thus LANE must define the following:
1. How end systems on two separate LANs in the same Media Access Control (MAC) layer can exchange MAC frames across the ATM network.
2. How end system LANs attached directly to an ATM switch can interoperate.

End systems attached to a legacy LAN are not affected by LANE. Such end systems utilize the ordinary protocols. However, at the point of connection to the ATM backbone, an ATM-to-LAN converter is utilized. The process of converting LAN frames to cells and cells to LAN frames is performed by the ATM Adaptation Layer (AAL). LANE instructions are utilized to coordinate and map LAN frames across an ATM link.

As previously explained, fast Ethernet utilizes intermittent pause intervals as a means to control traffic flow and avoid excessive network congestion. ATM, on the other hand, utilizes feedback from RM cells to implement a rate-based flow control in terms of altering a rate of transmission measure in bits per second. In order to enhance the practicability and quality of Ethernet-to-ATM backbone networks, an method and system for mapping a pause interval flow control to rate-based flow control would be useful.

In view of the above can therefore be appreciated that a need exists for a method and system within a heterogeneous telecommunications network for adapting pause interval flow control mechanisms to rate-based flow control mechanisms. If implemented, such a method and system would ensure optimum allocation of limited bandwidth among a plurality of hybrid sessions.

SUMMARY OF THE INVENTION

It is therefore an object of the invention to provide an improved method and system for managing communications networks.

It is another object of the invention to provide a method and system within a telecommunications network for efficiently adapting a pause interval flow control mechanism to a rate-based flow control mechanism.

It is a further object of the invention to allocate bandwidth among a plurality of sessions that utilize both pause interval and rate-based flow control.

The above and other objects are achieved as is now described. A method and system within a telecommunications network for allocating available bandwidth among a plurality of sessions that share a common data link are disclosed. First, a repeating unit time interval is designated for conducting the plurality of sessions. Next, the input flow rate from the source node of each of the sessions into the common data link is monitored. Thereafter, a target flow rate is computed and assigned to each of the sessions. The sum of the target flow rates is equal to the available bandwidth of the common data link. Finally, for each of the sessions in which the monitored input flow rate exceeds the assigned target flow rate, the source node is dynamically paused during each repeating unit time interval, such that the monitored input flow rate conforms to the assigned target flow rate for each of the sessions.

BRIEF DESCRIPTION OF THE DRAWINGS

The novel features believed characteristic of the invention are set forth in the appended claims. The invention itself, however, as well as a preferred mode of utilize, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 3:
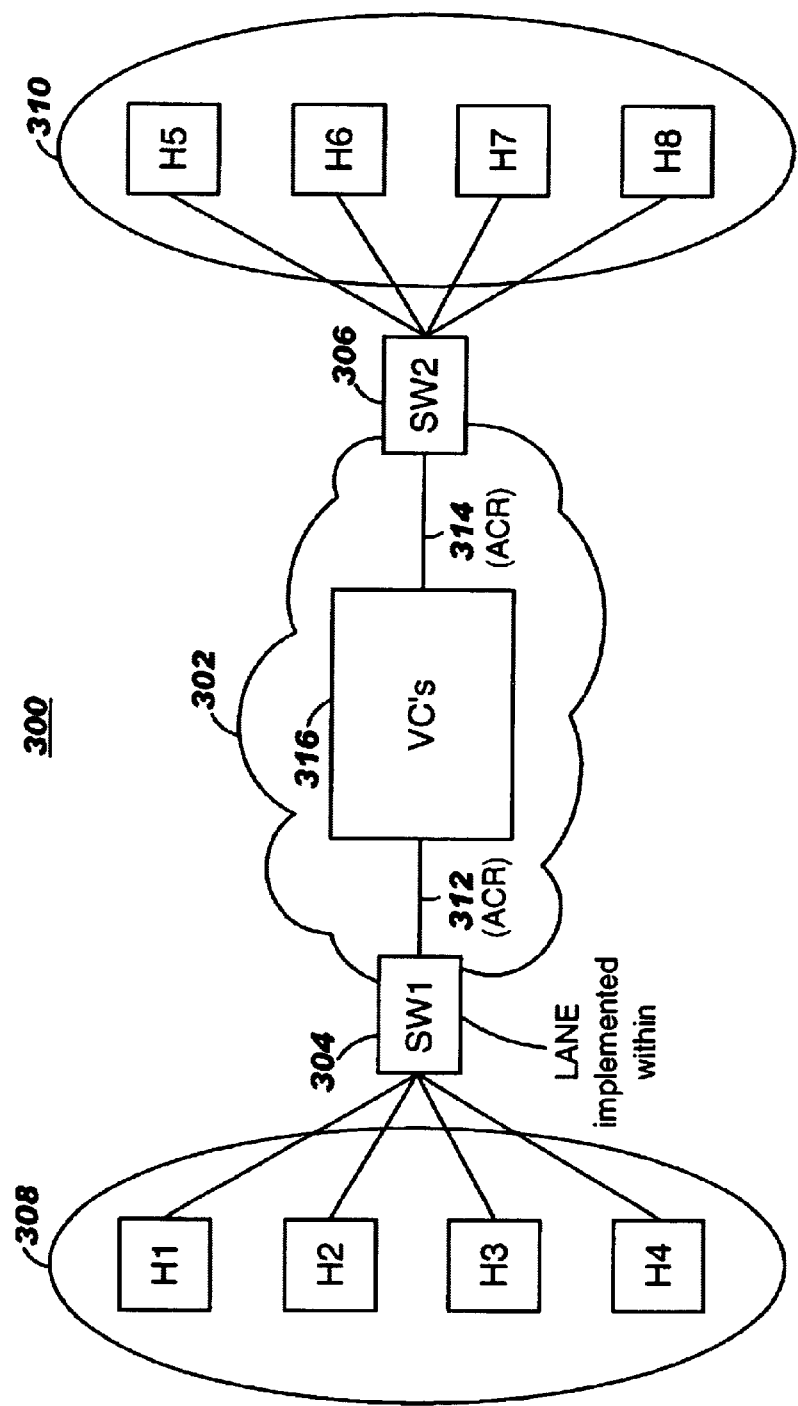
FIG. 3 depicts a representative heterogeneous Ethernet-to-ATM backbone telecommunications network in which the method and system of the present invention may be advantageously implemented.

The method and system of the present invention focuses on the development of mechanisms for efficiently mapping between ABR flow control in ATM networks and the on/off flow control of LAN media such as Ethernet. The scenario of its applicability is shown in FIG. 3 which depicts end stations 308 and 310 attached to Ethernet media. As illustrated in FIG. 3, end stations 308 and 310 are interconnected amongst themselves through at least one virtual circuit (VC) 316 that lies within an ATM backbone 302 built utilizing ATM switches. The LAN media attached end stations 308 are connected to ATM backbone 302 utilizing edge switches SW1 304 and SW2 306. These edge switches are basically LAN switches that can seamless transfer LAN media frames across an ATM network utilizing LANE. LANE is responsible for setting up a data direct VC connection 316 from SW1 304 to SW2 306 over ATM backbone 302. In this example, SW1 304 and SW2 306 relay data from endstations 308 and 310 across ATM links 312 and 314 that form the input and output to and from VC 316.

It will be assumed that VC 316 utilizes ABR flow control to minimize cell loss due to congestion in ATM backbone 302. Edge switches SW1 304 and SW2 306 must act as virtual source and virtual destination of ATM VC 316. The ABR algorithm provides an allowable cell rate, which the source must adhere to. During congestion, the output queue for a given VC may build up, if the aggregate data being sent through the VC exceeds the allowable cell rate (ACR). At such times, it would be desirable to generate pause frames which pause the actual sources of traffic which may be the cause of congestion. The present invention teaches a method for monitoring traffic from the LAN end stations destined for the ATM cloud, which is then utilized to make decisions about which end stations need to be paused and for how long. The method and system utilized for computing the pause duration is based on the notion of max-min fairness, which as previously explained, is a widely utilized metric for measuring the fairness of flow control algorithms.

The present invention introduces a new method and system by which the flow control mechanism utilized within high speed Ethernet LANs is efficiently adapted to ATM ABR flow control. The present invention may be advantageously implemented within an ATM edge switch that serves as the gateway between LAN networks and an ATM backbone. For clarity of explanation, network having an ATM backbone supporting LAN systems will be referred to hereinafter as "hybrid" systems. Also, switches that serve as the gateway between LAN and ATM media will be referred to hereinafter as "edge switches".

Figure 4:
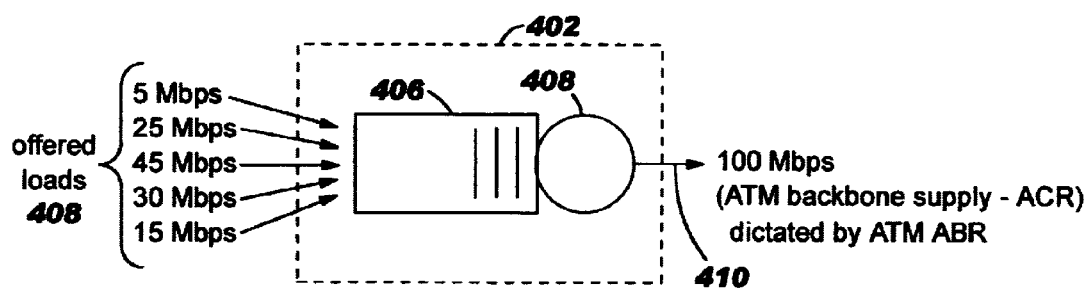
FIG. 4 is a simplified representation of an Ethernet-to-ATM edge switch in which the method and system of the present invention may be advantageously utilized.

Focusing on the seamless connection of ATM backbone bandwidth supply and Ethernet LAN demand, let us consider the following example of max-min allocation. FIG. 4 depicts an Ethernet-to-ATM edge switch 400 in which ATM ABR dictates a current send rate supply of 100 Mbs while five sources 408 demand 5, 25, 45, 30, and 15 Mbs. The level of "demand" by an upstream source node will be referred to hereinafter as "offered input rate". Edge switch 400 includes an input section 406 which receives data packets from sources 408. The data flow from each of sources 408 into input section 406 represents a unique communications session. Edge switch 400 also includes an output link 410 which is shared by the sessions. Output link 410 represents a shared medium connecting sessions from sources 408 into an ATM backbone (not depicted). Output link 410 is the point of origination of a virtual circuit (VC) across the ATM backbone. In the depicted example, the flow rate at output link 410 is dictated by a category of ATM traffic known as Available Bit Rate (ABR). It should be noted that sessions are identified as distinct source-destination pairs since a single intermediary source such as a switch port, may transmit data to several distinct destinations. Therefore, the total number of sessions served by the five sources 408 may be equal to or greater than five.

Within input section 406, incoming data packets (Ethernet frames in this case) are first converted to sets of 53 byte cells. The Ethernet source and destination addresses in each frame are mapped to the appropriate VC identifiers for the connection involved. The resulting cells from the five data streams from sources 408 are multiplexed with each other and sent from output link 410 as a serial bit stream.

The configuration shown in FIG. 4, edge switch 400 acts as a virtual source for the VC shared by the sessions from sources 408. On a given ABR VC, the source sends data cells to the destination through one or more intermediate ATM switches. Furthermore, in accordance with ATM ABR traffic convention, the source of a VC (switch 400) periodically creates and delivers special control cells called Resource Management (RM) cells which travel through the same path as data cells of the VC to the destination of the VC. The destination then routes the RM cells back to the source through the same path.

The present invention requires first of all that a control interval T, perhaps T=1000 time slots, be specified. During each interval for each pair of source and destination MAC addresses with outgoing ABR VC traffic from the switch, the following information must be maintained in a table:

TABLE 1

| Source/Destination | No. Bytes Received | Input Rate (bps) | Fair Share (bps) | Pause Period (slots) |
|---|---|---|---|---|
| (Src, Dst)$_1$ | $b_1$ | $x_1$ | $r_1$ | $p_1$ |
| (Src, Dst)$_2$ | $b_1$ | $x_1$ | $r_1$ | $p_1$ |
| (Src, Dst)$_n$ | $b_1$ | $x_1$ | $r_1$ | $p_1$ |

The next step specified by the present invention is computation of the max-min fair rates for each session. After a target rate, that is, an ABR flow rate has been determined, the present invention ensures as follows that sources are paused in a manner consistent with that rate. This is accomplished through computation of the number of time slots for a source to pause during a sequence of control slots comprising a control interval. A control interval might consist of 10 to 10,000 time slots. The present invention includes two pause period calculations, Method A and Method B.

Figure 5:
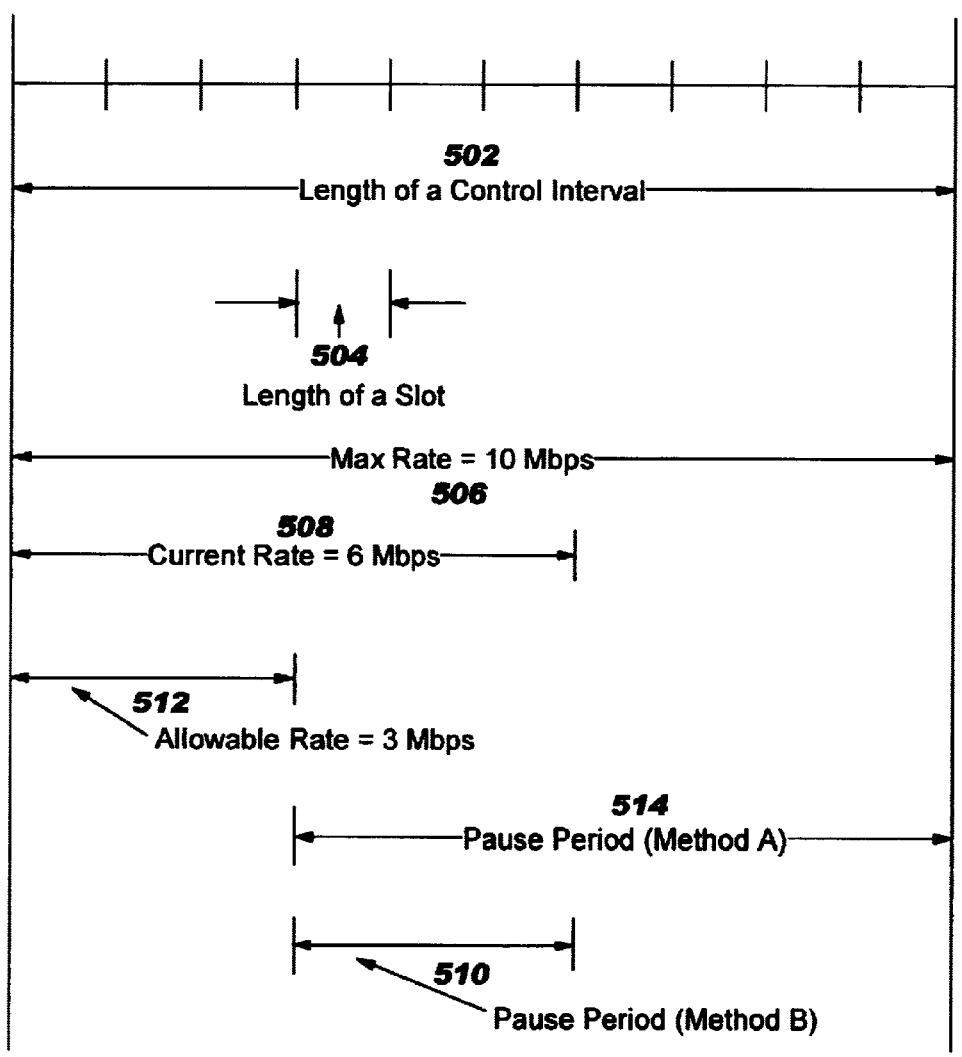
FIG. 5 depicts a control interval in accordance with the method and system of the present invention.

FIG. 5 illustrates the concepts of control intervals and pause periods just discussed. From the example provided in FIG. 5, the significance of the length 502 of a control interval 500 can be observed. On one hand, a large control interval is desirable because of the granularity (in terms of number of time slots) and the low overhead. On the other hand, a small control interval is desirable because of the ability to react quickly to changes in offered load, but has the drawback of a higher processing overhead.

In the example illustrated in FIG. 5, the length 502 of control interval 500 represents the time duration of control interval 500 in units of time slots. Superimposed on this time scale are transmission flow rates 506, 508, and 512, and two pause intervals 514 and 510. Flow rate 506 illustrates the maximum rate of transmission achievable on a given medium. It should be noted that the length 502 of control interval 500 coincides with maximum flow rate 506. As is often the case, the actual or current flow rate 508 is less than maximum rate 506 but is still higher than the allowable or target flow rate 512.

In order to assure compliance with the target flow rate 512, the source will be paused during each control interval 500. A conservative approach to ensure compliance at all transmission rates including maximum rate 506, is to pause each control interval over a pause period 514, computed in accordance with Method A described below.

Method A uses a very conservative approach to computing the pause period. We refer to it as a static pause period because, given a target rate and link speed, this method simply computes the amount of time that the source should pause to achieve the desired rate. This is done as follows. Assume that the target rate is r and the link speed is L. Assume the control interval is T time slots. Then the pause time p in time slots is compute by Method A in accordance with the relation:

$$p=(1-r/L)*T$$

wherein p is the pause period in time slots, r designated target rate 512, L is the maximum flow rate (link speed) 506, and T designates the length or duration 502, of control interval 500. Thus the number of time slots in which the source is permitted to send at rate is 10−7=3 time slots. Algebra shows that with this computation, it is impossible for the source to ever transmit at a rate higher than target rate 512.

There are some drawbacks to this computation. First, even though a sender transmits data to multiple MAC addresses, it will be paused to adjust the cumulative traffic rate to the target rate. Therefore traffic for all other sessions will also be reduced. In addition, it will be difficult to know when the congestion has subsided since the source will either be severely limited to the target rate or will not be regulated at all. This can lead to oscillatory behavior.

It is often the case, however, that the actual transmission rate 508 is less than maximum. Method B avoids the drawbacks of Method A as follows. Assume that the target rate 512 is designated r, and the current send rate is x>0. Let T denote the control interval (in time slots) and let p(t) denote the current pause time in time slots. Then the next pause time p(t+1) in time slots is computed by Method B in accordance with the relation:

$$p(t+1)=\max\{0, T-(T-p(t))*r/x\} \qquad (1)$$

Thus the next value of the transmit period in time slots is $$T-p(t+1)=\min\{T, (T-p(t))*r/x\}$$

The transmit period T−p therefore either increases exponentially if r/x>1 or decreases exponentially if r/x<1 or remains the same if r=x. The greater the difference between r and x, the greater the rate of increase or decrease in transmit period.

Furthermore the present invention includes a generalization of equation (1), namely:

$$p(t+1)=\max\{0, (1-k)*p(t)+k*[T-(T-p(t))*r/x]\} \quad (2)$$

Here k with 0<k<=1 is an exponential weight. Equation (2) is just an exponentially weighted average of the present value p(t) with the next value p(t+1) computed in (1). If k=1, then equations (1) and (2) are identical. The effect of (2) is to further smooth changes in p.

Figure 6:
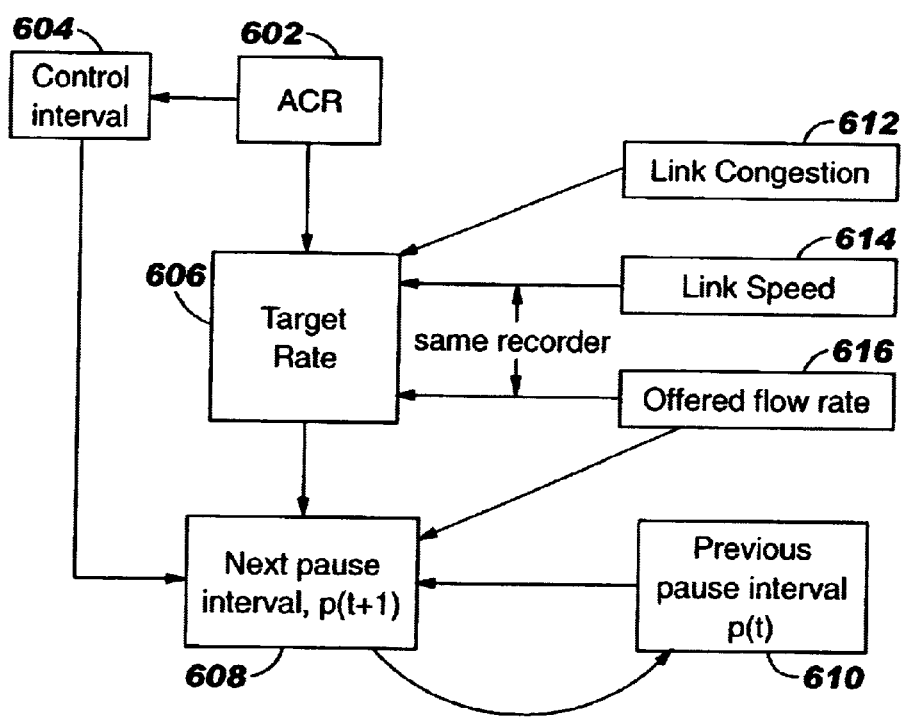
FIG. 6 is a block diagram illustrating a flow control system in accordance with the teachings of the present invention.

FIG. 6 is a block diagram illustrating a flow control system 600 in accordance with the teachings of the present invention. Flow control system 600 includes both functional and informational blocks that may be categorized as contributing to one or both of two major computations. The utility of the present invention lies in providing an organized and efficient approach to adapting the on/off or pause interval flow control mechanisms, such as those recently developed for use in Fast Ethernet systems, to rate-based flow control mechanisms such as the ACR method of flow control utilized by ATM ABR. Flow control system 600 may therefore be advantageously implemented within an Ethernet-to-ATM edge switch serving as the gateway between Ethernet LANs and an ATM backbone.

Although flow control system 600 may be employed globally, the following explanation and description of the operation of flow control system 600 will be explained in the context of a single ATM ABR link. The first major computation performed within flow control system 600 is that depicted by target rate block 606. The input parameters utilized in deriving the target flow rate include the ACR 602 of the ATM link, link congestion 612 and link speed 614 of the upstream sources, and the offered flow rates 616 of the upstream sources.

The present invention includes two alternative methods for finding max-min flows that may be advantageously utilized as the target rates. The chief advantage of both mechanisms is that no global knowledge of flows or congestion states is needed. One needs to know for each flow that at least one link used by the flow somewhere in the network is congested (link congestion 612), or that no link used by the flow is congested. Also, the capacity of the link Li (link speed 614) through which flow i enters the network is needed. The chief disadvantage of Mechanisms 1 and 2 is that the max-min flow values are determined only approximately and asymptotically.

The following definitions will be utilized in discussing both max-min computation mechanisms:

Max$_i$ (offered flow rate 616)=offered flow rate for session i;

Li (link speed 614)=bandwidth capacity of the link through which flow i enters the network (constant);

$F_i(0)$=initial flow rate for session i , i=0, 1, 2, . . . , N−1. These values can be arbitrary nonnegative numbers such as 0, $L_i$, $L_i/N$, or values determined by some previous calculation with different flows or capacities.

$F_i(t)$=flow rate of session i after iteration t=1, 2, 3, . . .

$C_i(t)$ (link congestion 612)=0 if no link used by session i at iteration t with flows $\{F_j(t)\}$ is congested, else 1; and k=a tunable number between 0 and 1 giving the speed with which equilibrium is reached.

Two mechanisms, Mechanism 1 and Mechanism 2, for computing a max-min target rate for a plurality of sessions sharing a single data link are described below.

Mechanism 1 (Exponential Damping)

Given offered flows Max$_i$ and links with capacities $\{L_j\}$ in various paths used by flows, we seek final flows $F_i$ which are the max-min flows for the network.

At target rate computation block 606, the following equation is iterated for each flow until a max-min target rate value stabilizes within acceptable tolerances.

$$F_i(t+1)=\min\{\text{Max}_i, F_i(t)-k*(F_i(t)-C_i(t)*L_i)\}$$

Mechanism 2 (Critical Damping)

Given offered flows Maxi and links with capacities $\{L_j\}$ in various paths used by flows, we seek final flows Fi which are the max-min flows for the network.

At target rate computation block 606, the following equation is iterated for each flow until a max-min target value stabilizes within acceptable tolerances.

$$F_i(t+1)=2*F_i(t)-F_i(t-1)-k^2*(F_i(t-1)-C_i(t-1)*L_i)-2*k*(F_i(t)-F_i(t-1))$$

Mechanisms 1 and 2 are difference equation versions of the standard differential equations for exponential decay (to either 0 or Li) and critical damping of a damped harmonic oscillator (to either 0 or Li).

Figure 1:
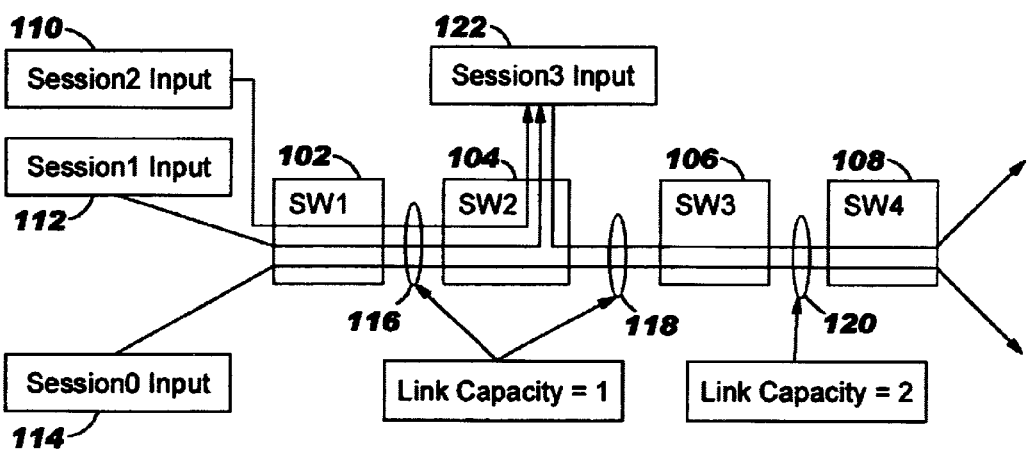
FIG. 1 is a block diagram illustrative of max-min fairness issues that arise when pause intervals are utilized to implement flow control.
Figure 2:
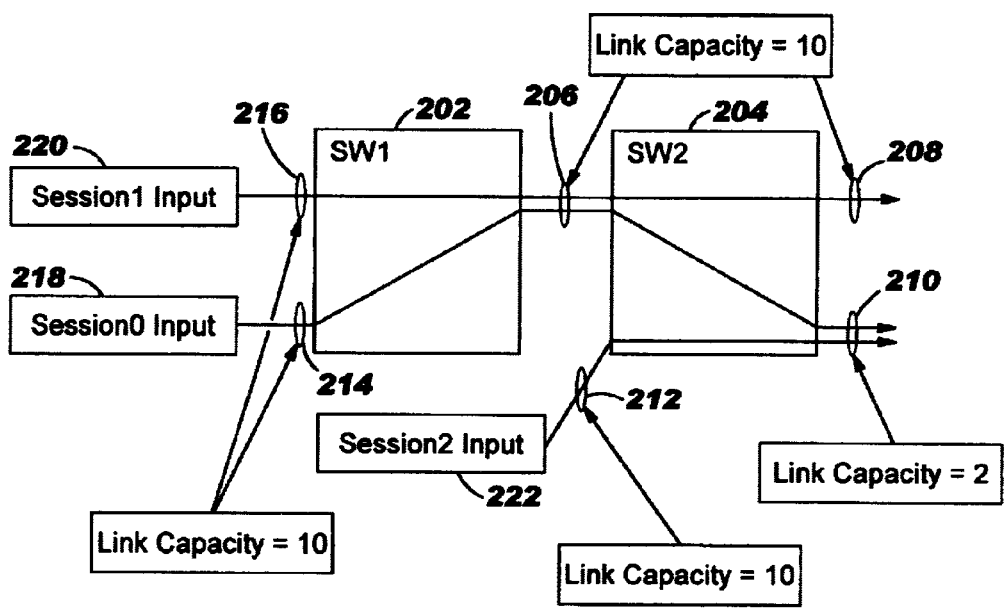
FIG. 2 illustrates network underutilization caused by on/off flow control within a data network.
Figure 8:
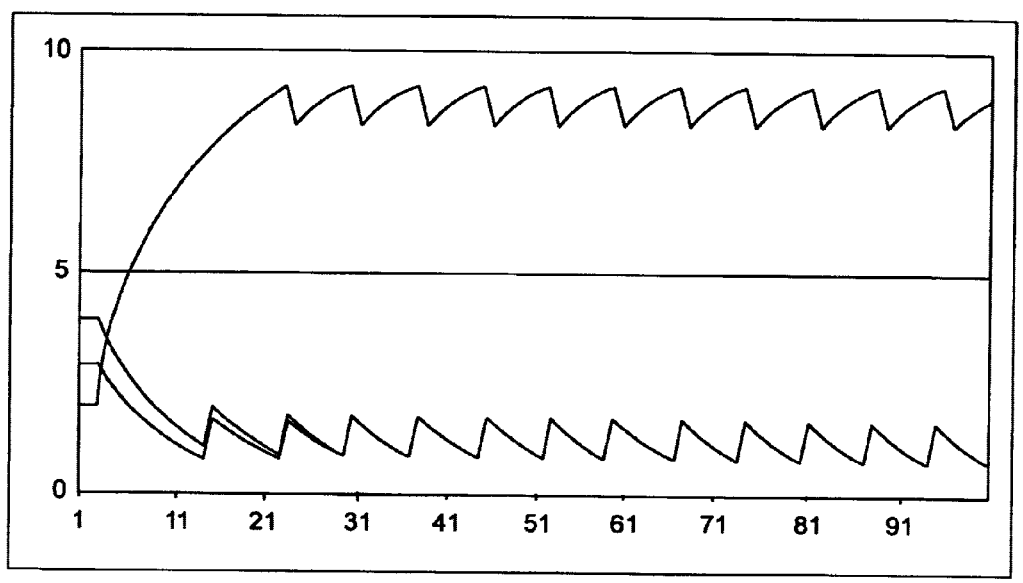
FIG. 8 is a graphical representation illustrating a max-min target flow rate for the network of FIG. 2 as computed by Mechanism 1 of the present invention.
Figure 9:
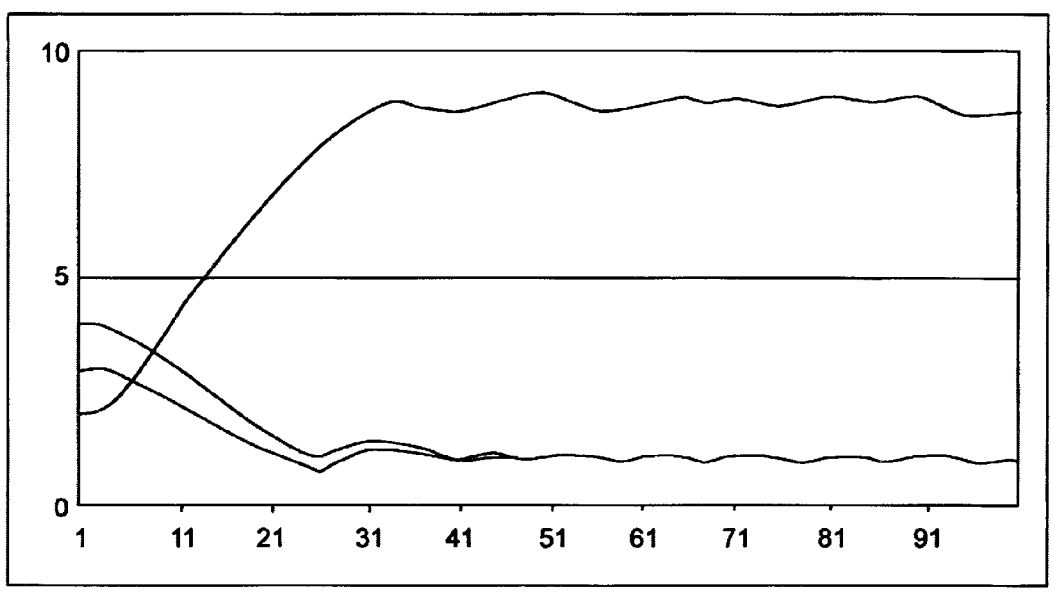
FIG. 9 is a graphical representation depicting a max-min target flow rate for the network of FIG. 2 as computed by Mechanism 2 of the present invention.

Applied to the example in FIG. 2, Mechanisms 1 and 2 yield the results illustrated in FIGS. 8 and 9. In both simulations the initial flow rates were arbitrarily defined as $F_0=2$, $F_1=3$, and $F_2=4$.

After a target rate has been computed utilizing one of the two mechansisms described above, a pause interval duration is computed at block 608. Flow control system 600 provides several input parameters from which the pause interval is derived including the control interval 604, the offered flow rate 616, the target rate determined within target rate block 606, and the duration of the previous pause interval 610. The pause interval computation performed at block 608 may be either the "static" or Method A computation or the dynamic or Method B computation described with reference to FIG. 5.

Figure 7:
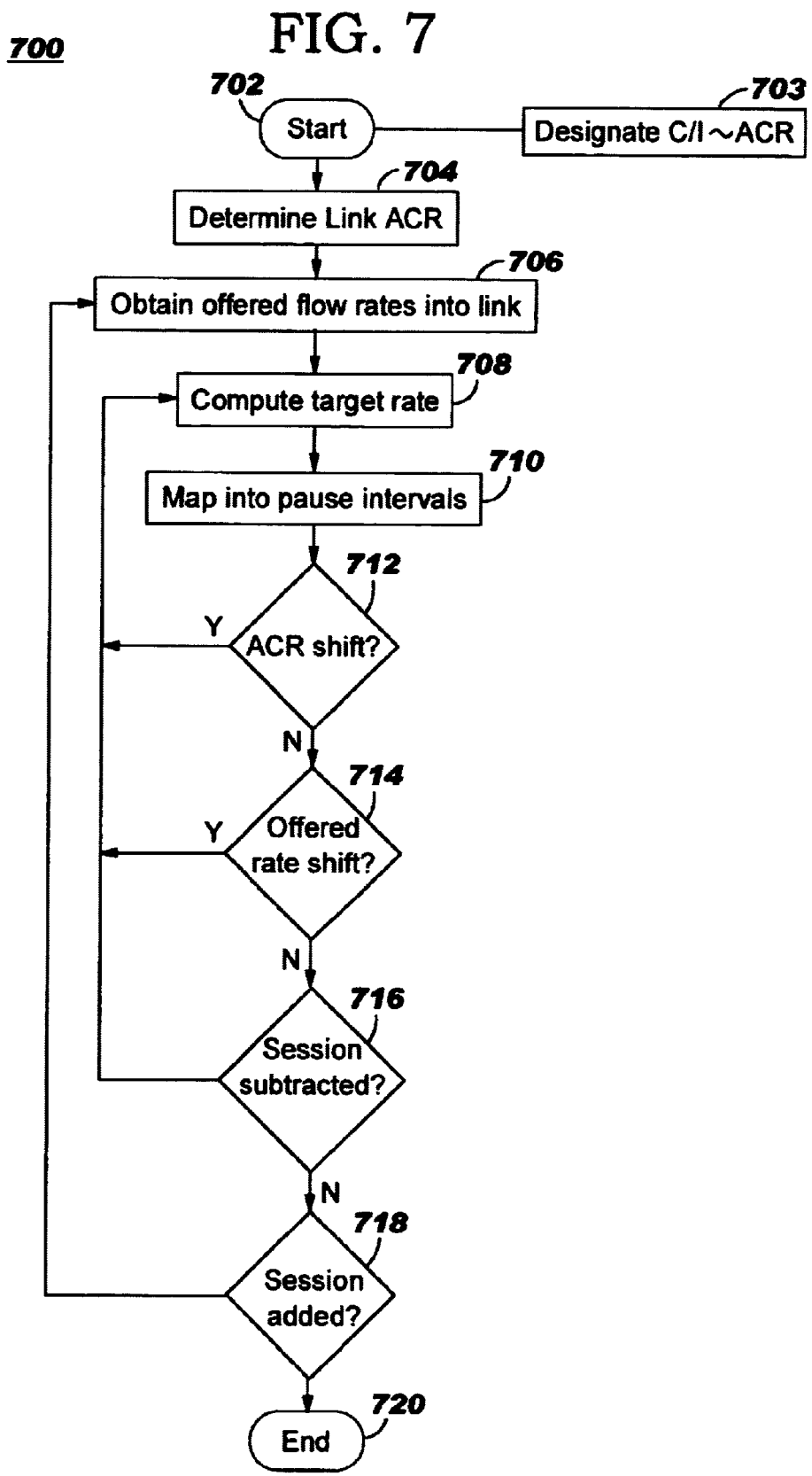
FIG. 7 is a high level logic diagram depicting a flow control method in accordance with the teachings of the present invention.

Turning now to FIG. 7, there is depicted a flow control methodology 700 that includes steps taken in implementing flow control within an ATM edge switch in accordance with the method and system of the present invention. The method begins at step 702 and proceeds to step 704 which depicts the determination of a current ACR for an ABR VC shared by multiple LAN sessions. The ACR will be a function of the current level of traffic within the ATM backbone and may be determined in accordance with conventional ABR flow control methodologies. Next, an offered flow rate is individually determined for each of the sessions that share the ABR VC as illustrated at step 706. This determination may be made by measuring the input flow rate of each session at the input port of the edge switch. As described with reference to Table 1, a special computation may be necessary to ascertain such input flow rates since data packets may vary in length and are delivered at varying time intervals.

Method 700 proceeds to step 708 which depicts computation of a target rate for each input session. This target rate represents the desired input flow rate from source nodes into an edge switch. In one embodiment of the present invention, this target rate may be obtained by computing the max-min fair share of bandwidth that each session should be provided. As explained with reference to FIG. 6, the present invention provides two novel approaches to deriving such max-min values. It should be noted, that these target rates may be derived utilizing various other methods without departing from the spirit and scope of the present invention.

Next, as illustrated at step 710, each target rate is mapped into a pause interval as described with reference to FIGS. 5 and 6. The duration of pause interval P(t+1), derived at step 710 will be greater than or equal to zero and in accordance with the teachings of the present invention may be obtained in accordance with the relation:

$$p(t+1)=\max\{0, T-(T-p(t))*r/x\}$$

wherein (t+1) designates the time step to follow timestep t, and T designates the time span comprising one control interval.

In such a manner the target flow rates computed at step 708, in accordance with the fair share value allocated to each session may be either less than or equal to the offered send rate determined as illustrated at step 706. Therefore, if for a given session the fair share value is equal to the offered send rate, the pause interval derived at step 710 will be zero (no pause). If the fair share value is less than the offered send rate, the pause interval will be a fraction of the control interval as described with reference to FIG. 5. Fast Ethernet utilizes a "time slot" as the pause timestep. Therefore as applied to sessions which utilize this type of flow control, the pause interval derived at step 710 will be in the form of a number of time slots.

Steps 712, 714, and 716 illustrate dynamic responses of flow control methodology 700 to real-time variations of parameters relevant to flow control. Step 712 depicts periodic inquiry into whether the ACR determined at step 704 has changed. As explained with reference to FIG. 4, such changes may occur upon the arrival of an processed and returned RM cell. In one embodiment of the present invention, the ACR inquiry at step 712 is made during each interval in which a RM cell arrives. If a shift in ACR is detected at step 712, the pause intervals will be recomputed by repeating steps 708 and 710. The offered input flow rate of each upstream source is another parameter whose real-time variation may necessitate the periodic adjustment of the pause intervals as illustrated by steps 714, 708, and 710. Similarly, if a session, as designated by a source-destination tuple, terminates or is otherwise subtracted from the sessions currently being served by the ATM link, the ACR bandwidth will have to be reallocated among the remaining sessions as depicted at steps 716, 708, and 710. If an session is added, the offered flow rate of this new session will be obtained prior to reallocation of the ACR bandwidth as depicted at steps 718, 706, 708, and 710.

In summary, the present invention includes mechanisms for determining a fair and sustainable send rate for each LAN Ethernet source connected through a switch to an ATM backbone. Furthermore, the present invention includes methods for converting that target value into pause times in comformity with IEEE 802.3x flow control.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of symbols, characters, or the like, the reader should remember that all of these and similar terms should be associated with the appropriate physical elements. Thus, a method for implementing the present invention as depicted in FIGS. 6 and 7, can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method within a telecommunications network for allocating available bandwidth among a plurality of sessions that share a common data link, each of said sessions having a source node that transmits data to a destination node through said data link, said method comprising the steps of:

designating a repeating unit time interval for conducting said plurality of sessions;

monitoring an input flow rate from the source node of each of said sessions into said common data link;

assigning a target flow rate to each of said sessions, wherein the sum of said target flow rates is equal to the available bandwidth of said common data link;

comparing monitored input flow rate of each said sessions with assigned target flow rate;

for each of said sessions in which said monitored input flow rate exceeds said assigned target flow rate, dynamically pausing said source node during each repeating unit time interval, such that for each of said sessions, said monitored input flow rate conforms to said assigned target flow rate.

2. The method of claim 1, wherein said common data link is an ATM available bit rate link having an adjustable allowable cell rate, and wherein said step of designating a repeating unit time interval includes the step of defining a control interval that varies in proportion to said allowable cell rate.

3. The method of claim 2, wherein said control interval is dynamically computed in accordance with the relation:

$$T_{CI}=X(N_{RM}/ACR)$$

wherein $T_{CI}$ designates the duration of said control interval in seconds, $N_{RM}$ designates the number of ATM cells sent between RM cells, and X is a multiplier.

4. The method of claim 1, wherein said step of monitoring an input flow rate from the source node of each of said sessions includes the steps of:

counting the number of bytes received from each of said source nodes over a given time interval; and deriving an input flow rate for each of said source nodes.

5. The method of claim 1, further comprising the step of deriving the target flow rate for each of said sessions into said common data link in accordance with the iterative relation:

$$F_i(t+1)=\min\{\text{Max}_i, F_i(t)-k*F_i(t)-C_i(t)*L_i\}$$

wherein Max$_i$ is the offered flow rate from said source node, i designates a particular session among said plurality of sessions, t is an increment value for each iteration, k is a weighting factor between 0 and 1, C designates a congestion flag, and L designates the determined bandwidth capacity of the common data link.

6. The method of claim 1, further comprising the step of deriving the target flow rate of each of said sessions into said switch node in accordance with the iterative relation:

$$F_i(t+1)=2*F_i(t)-F_i(t-1) -k^\wedge-2*(F_i(t-1)-C_i(t-1)*L_i)-2*k*(F_i(t)-F_i(t-1))$$

wherein i designates a particular session among said plurality of sessions, t is the increment value for each iteration, k is a weighting factor between 0 and 1, C designates a congestion flag, and L designates the determined bandwidth capacity of the link through which a session enters the network.

7. The method of claim 1, wherein said step of dynamically pausing the source node is preceded by the step of computing a pause interval, p, in accordance with the relation:

$$p=(1-r/L)*T$$

wherein r is the target rate, L is the speed of the link, and T designates the time span comprising one control-interval.

8. The method of claim 1, wherein said step of dynamically pausing the source node of each session is preceded by the step of computing a pause interval, p, in accordance with the relation:

$$p(t+1)=\max\{0, T-(T-p(t))*r/x\}$$

wherein T designates the control interval as a fixed time span, r designates the target flow rate for said session, and x designates the current transmission rate of said session.

9. The method of claim 1, wherein said step of dynamically pausing the source node of each session is preceded by the step of computing a pause interval, p, in accordance with the relation:

$$p(t+1)=\max\{0, (1-k)*p(t)+k*[T-(T-p(t))*r/x]\}$$

wherein r is the target rate, T is the control interval, and k is the weighting factor between 0 and 1.

10. The method of claim 1, wherein said source node is comprised of a LAN end station connected within a LAN infrastructure.

11. The method of claim 10, wherein said LAN infrastructure is an Ethernet Network.

12. The method of claim 10, wherein said source node utilizes pause interval flow control.

13. The method of claim 10, wherein said step of dynamically pausing said source node is preceded by the step of translating said fair share rate into a pause interval.

14. The method of claim 1, wherein said telecommunications network includes a backbone which utilizes transmission rate flow control.

15. The method of claim 14, wherein said backbone is an ATM backbone and wherein said transmission flow control is performed utilizing ABR flow control, said method further comprising the step of determining a current cell rate for each of said sessions into said common link.

16. The method of claim 14, wherein said common data link is located at the egress of said LAN infrastructure and at the ingress of said backbone.

17. The method of claim 14, wherein said telecommunications network includes a first edge switch and a second edge switch, said first edge switch connecting said source node with said backbone and said second switch connecting said destination node with said backbone.

18. A method where a pause interval flow control is adapted to rate-based flow control within an edge switch serving as an egress from a source subnetwork and an ingress into a backbone subnetwork, said method comprising:

designating a repeating unit time interval over which data is transmitted from said source subnetwork to said backbone subnetwork;

assigning a target flow rate to a session within said edge switch, said session having a source node within said source subnetwork;

mapping said target flow rate into a pause interval; and during each of said unit time intervals, pausing the source of said session for a duration equal to said pause interval, such that the source transmits at the target rate.

19. A flow control system within a telecommunications network, said system comprising:

processing means for monitoring an input flow rate from a source node of each of a plurality of sessions that share a common data link;

processing means for assigning a target flow rate to each of said sessions, wherein the sum of said target flow rates is equal to the available bandwidth of said common data link;

processing means for detecting a condition wherein monitored input flow rates exceed assigned target flow rates; and processing means, responsive to the condition in which at least one of said monitored input flow rate exceeds said assigned target flow rate, for dynamically pausing said source node, during each repeating unit time interval, such that for each of said sessions said monitored input flow rate conforms to said assigned target flow rate.

20. The flow control system of claim 19, wherein said common data link is an ATM available bit rate link having an adjustable allowable cell rate, and wherein said repeating unit time interval is defined as a control interval that varies in proportion to said allowable cell rate.

21. The flow control system of claim 20, wherein said control interval is dynamically computed in accordance with the relation:

$$T_{CI}=X(N_{RM}/ACR)$$

wherein $T_{CI}$ designates the duration of said control interval in seconds, $N_{RM}$ designates the number of ATM cells sent between RM cells, and X is a multiplier.

22. The flow control system of claim 19, wherein said processing means for monitoring an input flow rate from the source node of each of said sessions further comprises:

a counter for counting the number of bytes received from each of said source nodes over a given time interval; and processing means for determining an input flow rate for each of said source nodes.

23. The flow control system of claim 19, further comprising computation means for computing the target flow rate for each of said sessions into said common data link in accordance with the iterative relation:

$$F_i(t+1)=\min\{Max_i, F_i(t)-k*F_i(t)-C_i(t)*L_i\}$$

wherein Max$_i$ is the offered flow rate from said source node, i designates a particular session among said plurality of sessions, t is an increment value for each iteration, k is a weighting factor between 0 and 1, C designates a congestion flag, and L designates the determined bandwidth capacity of the common data link.

24. The flow control system of claim 19, further comprising computation means for computing the target flow rate of each of said sessions into said switch node in accordance with the iterative relation:

$$F_i(t+1)=2*F_i(t)-F_i(t-1)-k^2*(F_i(t-1)-C_i(t-1)*L_i)-2*k*(F_i(t)-F_i(t-1))$$

wherein i designates a particular session among said plurality of sessions, t is the increment value for each iteration, k is a weighting factor between 0 and 1, C designates a congestion flag, and L designates the determined bandwidth capacity of the link through which a session enters the network.

25. The flow control system of claim 19, wherein said processing means for dynamically pausing the source node further comprises computation means for computing a pause interval, p, in accordance with the relation:

$$p=(1-r/L)*T$$

wherein r is the target rate, L is the speed of the link, and T designates the time span comprising one control interval.

26. The flow control system of claim 19, wherein said processing means for dynamically pausing the source node of each session further comprises computation means for computing a pause interval, p, in accordance with the relation:

$$p(t+1)=\max\{0, T-(T-p(t))*r/x\}$$

wherein T designates the control interval as a fixed time span, r designates the target flow rate for said session, and x designates the current transmission rate of said session.

27. The flow control system of claim 19, wherein said processing means for dynamically pausing the source node of each session further comprises computation means for computing a pause interval, p, in accordance with the relation:

$$p(t+1)=\max\{0, (1-k)*p(t)+k*[T-(T-p(t))*r/x]\}$$

wherein r is the target rate, T is the control interval, and k is the weighting factor between 0 and 1.

28. The flow control system of claim 19, wherein said source node is comprised of a LAN end station connected within a LAN infrastructure.

29. The flow control system of claim 28, wherein said LAN infrastructure is an Ethernet Network.

30. The flow control system of claim 28, wherein said source node utilizes pause interval flow control.

31. The flow control system of claim 19, wherein said telecommunications network includes a backbone which utilizes transmission rate flow control.

32. The flow control system of claim 31, wherein said backbone is an ATM backbone and wherein said transmission flow control is performed utilizing ABR flow control, said flow control system further comprising processing means for determining a current cell rate for each of said sessions into said common link.

33. The flow control system of claim 31, wherein said common data link is located at the egress of said LAN infrastructure and at the ingress of said backbone.

34. The flow control system of claim 31, wherein said telecommunications network includes a first edge switch and a second edge switch, said first edge switch connecting said source node with said backbone and said second switch connecting said destination node with said backbone.

35. The flow control system of claim 19 wherein the processing means includes a computer executing n, n greater than 1, application programs.

36. A program product executed by a computer system including a media on which at least one computer program is recorded, said computer program including:

code instructions monitoring an input flow rate from a source node of each of a plurality of sessions coupled into a common data link;

code instructions assigning a target f low rate to each of said sessions, wherein the sum of said target flow rates is equal to the available bandwidth of said common data link;

code instructions comparing monitored input flow rate of each said sessions with assigned target flow rate; and for each of said sessions in which said monitored input flow rate exceeds said assigned target flow rate, code instructions dynamically pausing said source node such that for each of said sessions said monitored input flow rate conforms to said assigned target flow rate.

37. A method within a communication network for allocating available bandwidth comprising acts of:

monitoring an input flow rate from a source node of each of a plurality of sessions coupled to a common data link;

assigning a target flow rate to each of said sessions, wherein the sum of said target flow rates is equal to the available bandwidth of said common data link;

comparing monitored input flow rate of each said sessions with assigned target flow rate; and for each of said sessions in which said monitored input flow rate exceeds said assigned target flow rate, dynamically pausing said source node such that for each of said sessions said monitored input flow rate conforms to said assigned target flow rate.

* * * * *